United States Patent [19]

Kobayashi et al.

[11] Patent Number: 4,617,080
[45] Date of Patent: Oct. 14, 1986

[54] FILM LAMINATING APPARATUS

[75] Inventors: Youichi Kobayashi, Saitama; Susumu Murakami, Tokyo, both of Japan

[73] Assignee: Sony Corporation, Tokyo, Japan

[21] Appl. No.: 679,051

[22] Filed: Dec. 6, 1984

[30] Foreign Application Priority Data

Dec. 9, 1983 [JP] Japan .......................... 58-190968[U]

[51] Int. Cl.⁴ .............................................. G05G 15/00
[52] U.S. Cl. .................................... 156/359; 156/361; 156/542; 226/27
[58] Field of Search ................................ 156/361–364, 156/540–542, 359; 53/51; 226/27–32

[56] References Cited

U.S. PATENT DOCUMENTS 2,877,586  3/1959  Chenery ........................... 156/540 X
2,880,539  4/1959  Frenkel et al. ...................... 156/361

Primary Examiner—David Simmons
Attorney, Agent, or Firm—Lewis H. Eslinger; Alvin Sinderbrand

[57] ABSTRACT

A film laminating apparatus, in which a continuous web of film has a plurality of heat-activation type film layers arranged thereon with predetermined spacing and is delivered together with a paper to a thermal transfer station to transfer the film layer onto the paper, includes an optical position indicator that is located ahead of each film layer on the web and that has optical transmission properties different from those of the web. An optical position detecting device is located at the entrance side of the transfer station, and drive rollers, pressure rollers, and a flat plate heater are operated in response to the output of the optical position detecting device to superpose the film layer onto the paper sheet so that the film covers less than the entire surface of the sheet.

9 Claims, 16 Drawing Figures

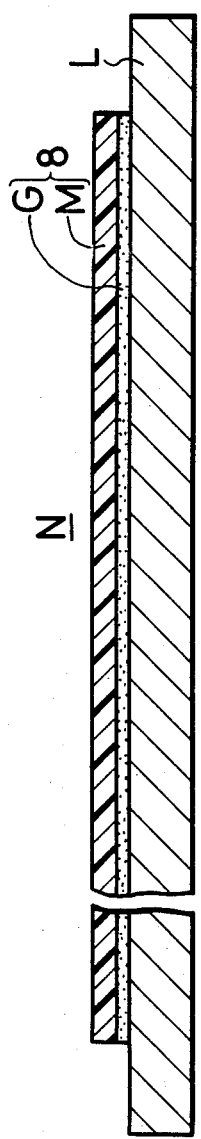
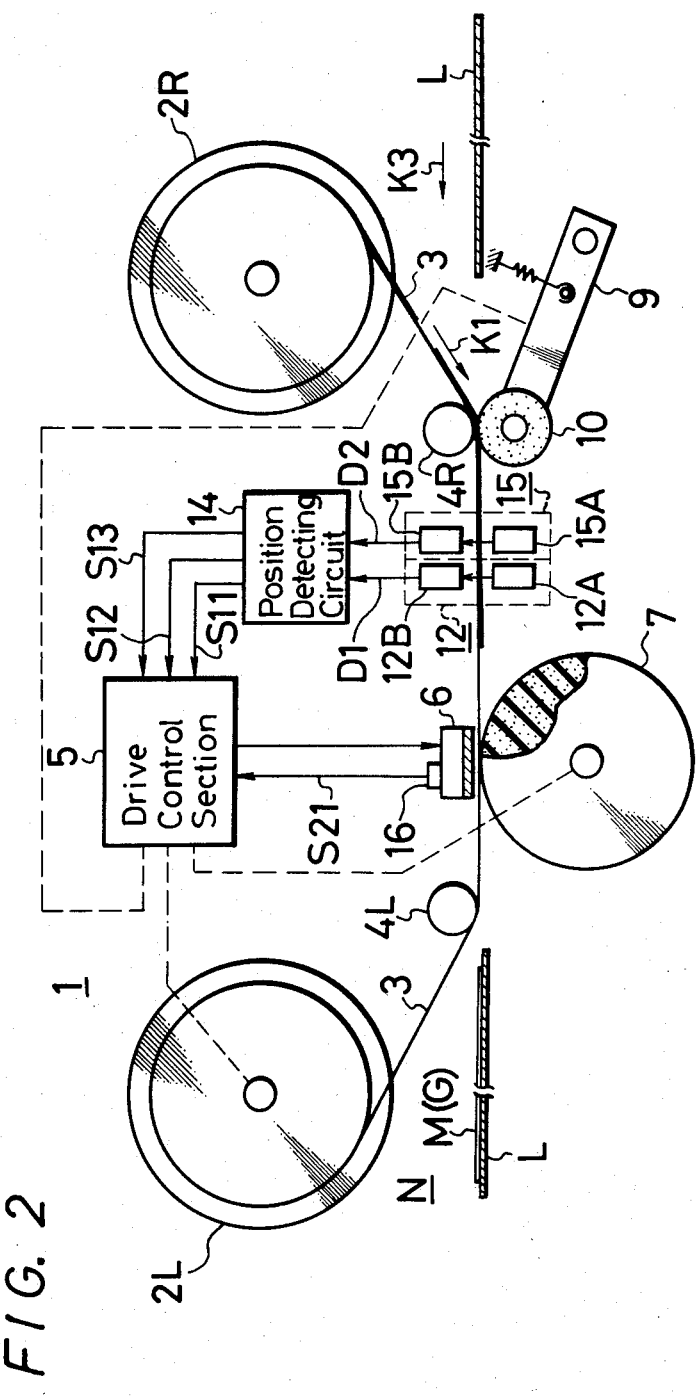
FIG. 1
FIG. 2

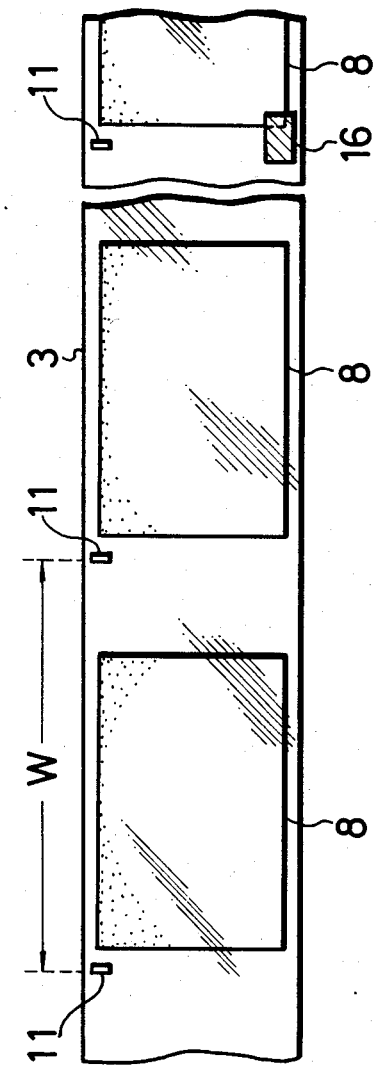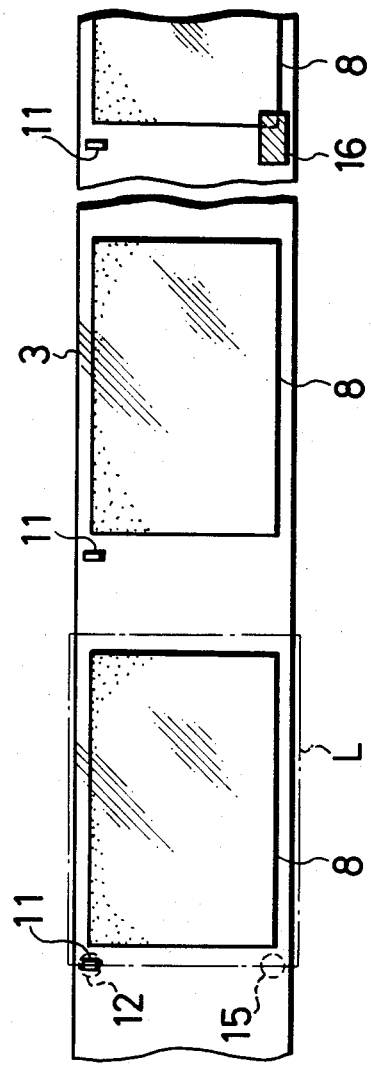
FIG. 3A
FIG. 3B

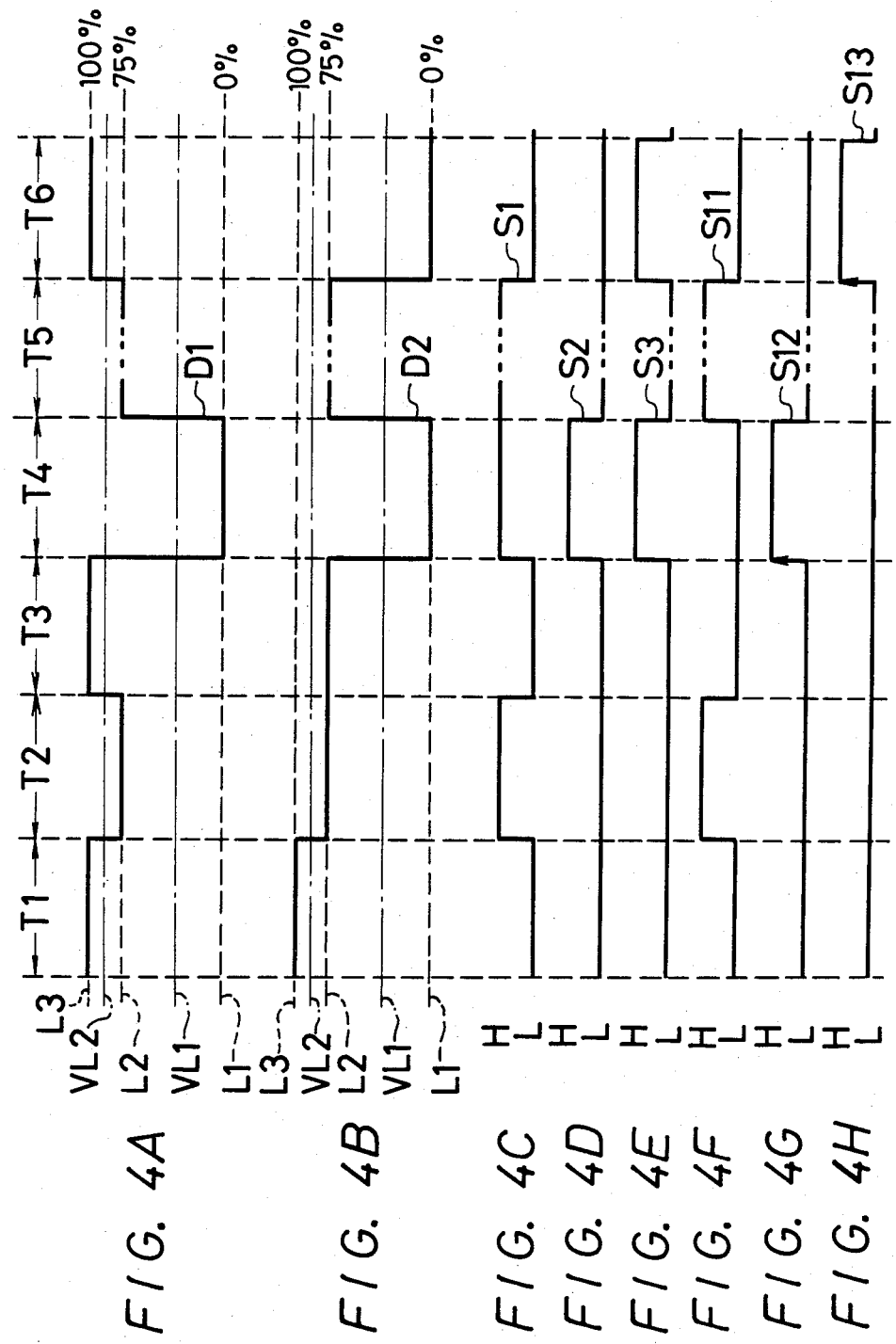

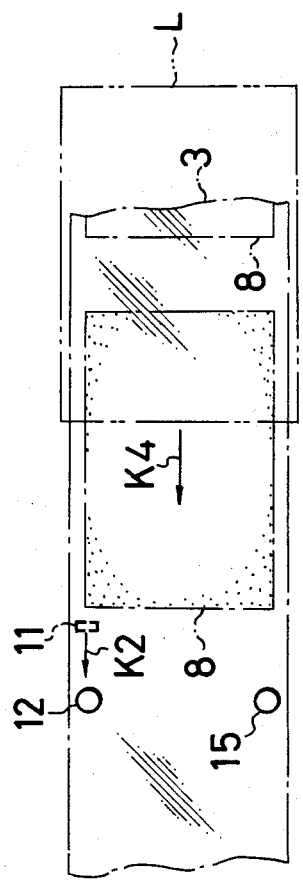
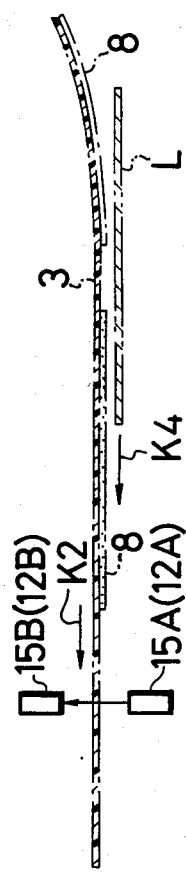
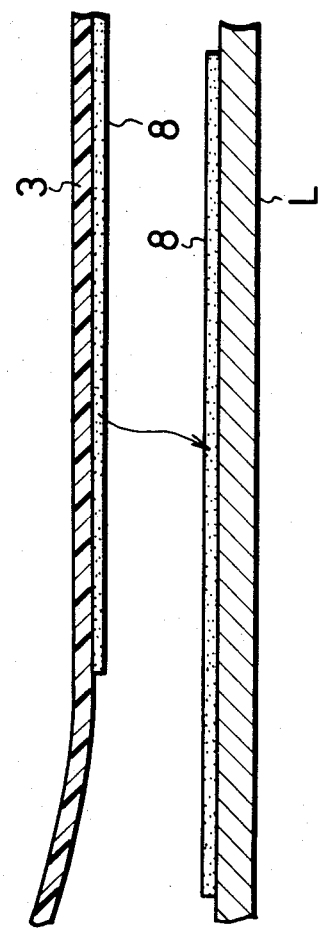
FIG. 6
FIG. 7
FIG. 8A
FIG. 8B

FILM LAMINATING APPARATUS

BACKGROUND OF THE INVENTION

1. Field of the Invention

The present invention relates to a film laminating apparatus and, more particularly, is directed to a film laminating apparatus by which a transparent film having a heat activiat layer is laminated onto a sheet of paper.

2. Description of the Background

It is known to produce a laminated article by laminating a transparent protective film formed, for example, of a polyester resin material having coated on its one surface a heat-activated bonding material and which is laminated onto a paper sheet on which has already been printed information such as characters, picture images, and the like. In this fashion, the information printed on the paper sheet is protected from degradation. In order to produce efficiently an acceptable end product the protective film must be positioned relative to the paper sheet both accurately and positively.

In known film laminating apparatus which in a plurality of films or sheets are laminated using thermal activation type adhesive agent, a heated roller is generally used as the heating device. Generally, the heated rollers used in such film laminating apparatus are of relatively large heat capacity and, thus, it takes a relatively long time to reach a sufficiently high operating temperature that the heated roller is able to perform the thermal transfer lamination. In other words, the so called "rise" time of the conventional heated roller is poor.

In order to maintain the temperature of the conventionally used heated roller constant, such roller is rotated continuously and while solving one problem, this presents another. Specifically, the laminating film has on its one surface a thermally activated adhesive layer and, because the heated roller is continuously rotated, the laminating film must be similarly moved at all times and, thus, a large amount of the film is wasted. Additionally, when no paper is present and the film is being heated and moved the thermal transfer of the film onto the rubber pressure roller typically employed will occur and, thus, the laminate film becomes bonded to the rubber pressure roller, thereby causing an unacceptable operating condition.

Moreover, in such prior art devices, because the heated roller is continuously rotated with its outer surfaces being heated, and because the heat roller is heated by an internally arranged electrical resistance element, the diameter and overall size of such heat roller becomes larger than desirable and also the ambient temperature of the surrounding machine elements is unacceptably increased. The consequence of this is that the film laminating apparatus using such heat roller becomes expensive and complex due to the necessity that all the constituent parts must have relatively high thermal resistance properties.

OBJECTS AND SUMMARY OF THE INVENTION

Accordingly, it is an object of the present invention to provide a film laminating apparatus that can eliminate the above-noted defects inherent in the prior art.

Another object of this invention is to provide a film laminating apparatus capable of accurately positioning a protective film relative to a paper sheet to be laminated using a method simpler than presently employed and with a greater degree of accuracy.

A further object of this invention is to provide a film laminating apparatus to laminate a plurality of films and sheets sequentially using a thermally activated adhesive agent in which a plate-type heater having a flat heat generating surface and a roller are arranged in close mutual contact with the films and sheets passing through the space between the plate heater and the roller.

In accordance with an aspect of the present invention the lamination of paper sheets bearing some printed indicia is performed, in which less than the entire surface of the paper sheet is covered with a transparent protective layer of film. The protective film is applied to the paper sheet using a flat-surfaced, plate heater and the protective films are provided by being affixed to a continuous web of film that is transported from a supply reel to a take-up reel through a thermal transfer station whereat the lamination process occurs. Only two optical position detectors are required to determine the exact location of each film on the web relative to the thermal transfer station and the paper sheet to be laminated. An aperture is formed in the continuous carrier web ahead of each film thereon and this is detected by one of the optical position detectors, both of which by detecting differences in the optical transmission density of the various materials provide detection signals of correspondingly different signal levels to a detecting circuit. The detecting circuit performs logical operations on these different level signals and provides control signals to a drive controller that operates various rollers and drives in the laminating apparatus that permit the paper sheet to be inserted in juxtaposition with the film prior to the thermal transfer processing.

The above and other objects, features, and advantages of the present invention will become apparent from the following detailed description of illustrative embodiments thereof to be read in conjunction with the accompanying drawings.

BRIEF DESCRIPTION OF THE DRAWINGS

FIG. 1 is a elevational cross-sectional view of a film and paper laminate produced according to the present invention;

FIG. 2 is a schematic representation of an embodiment of a film laminating apparatus according to the present invention;

FIGS. 3A and 3B are plan views schematically illustrating a film for use in the apparatus of FIG. 2;

FIGS. 4A–4H are signal waveform diagrams showing the signals present at several different points in the apparatus of FIG. 2;

FIG. 6 is a plan view useful for explaining the positioning operation of the film and paper;

FIG. 7 is a cross-sectional view useful for explaining the positioning operation of the film and paper; and FIGS. 8A and 8B are cross-sectional representations useful for explaining the operation in which the laminate film is transferred from the continuous film web to the paper sheets to be laminated.

DESCRIPTION OF THE PREFERRED EMBODIMENTS

Figure 5:
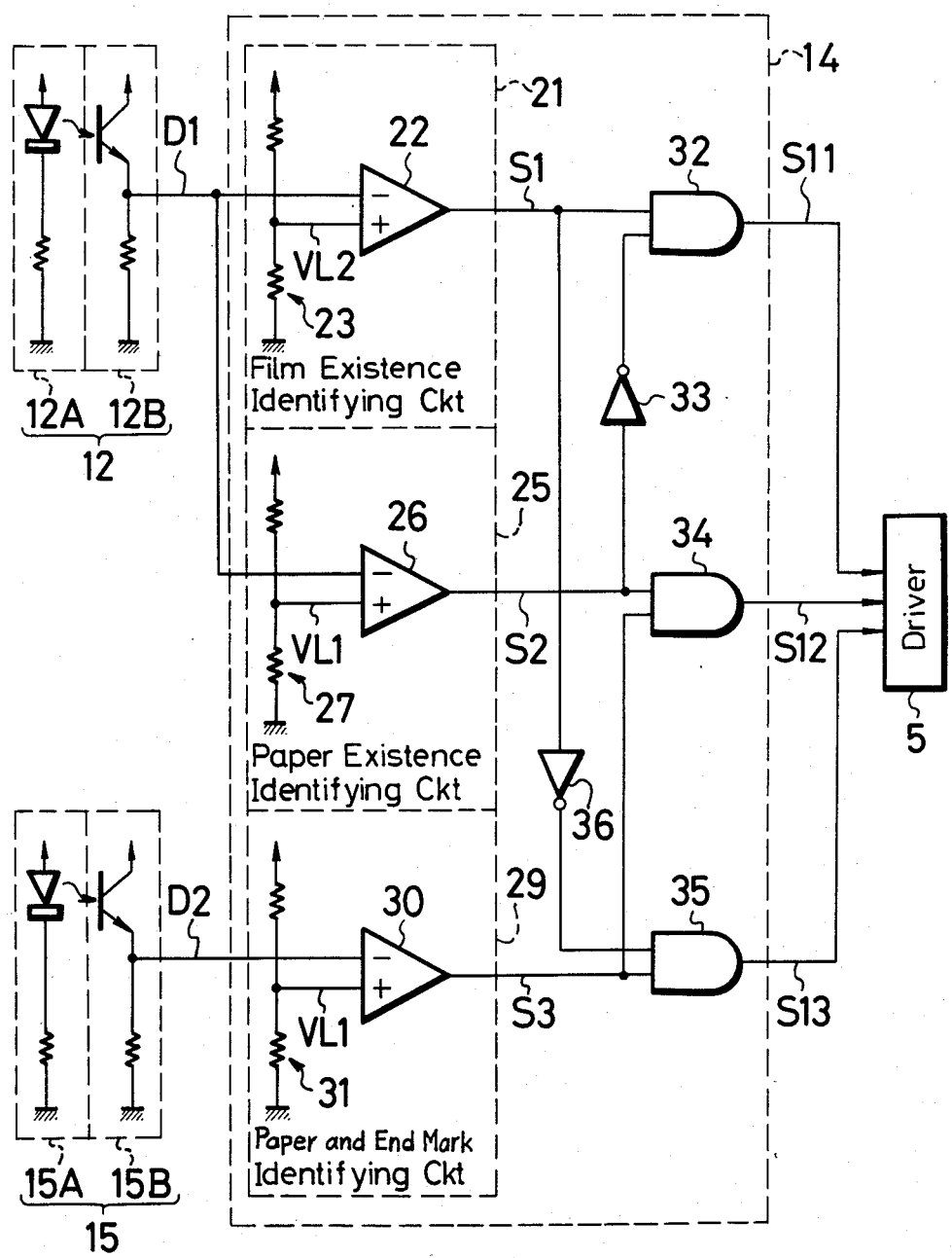
FIG. 5 is a schematic diagram of a position detecting circuit used in the apparatus of FIG. 2.

FIG. 1 is an elevatonal cross-sectional view of a film-laminated paper sheet produced according to the present invention. More specifically, a composite product N can be formed of a transparent protective film M comprising, for example, a polyester resin material having coated on one surface a heat bonding material G, which is laminated to a paper sheet L, upon which information such as characters, pictures, and the like have been printed. In order to provide a suitable end product the composite 8 formed of the transparent film M and heat bonding material G must be positioned accurately relative to the paper sheet L, and in that regard, according to the present invention the film does not cover the entire extent of the paper sheet, only that portion thereof whereat the printed information occurs.

Each film layer 8 is initially affixed to a web 3 in some fashion, for example, by a thermally activated layer (not shown) and has on its outer surface another thermally activated layer G, so that during the lamination process heat is applied to cause the film layer 8 to be released from the web 3 and to be bonded to the paper sheet L.

An embodiment of a film laminating apparatus according to the present invention is schematically represented in FIG. 2 in which a continuous web of tape-type film 3 having been wound on a supply reel 2R is threaded over guide rollers 4R and 4L to a take-up reel 2L and wound therearound. When take-up reel 2L is intermittently rotated a predetermined amount by drive control circuit 5, film web 3 will be intermittently moved in frame-by-frame fashion through guide rollers 4R and 4L in a direction represented by arrow K1.

Arranged between guide rollers 4R and 4L is a heat-bonding station comprising a heater element 6 and an ancillary roller 7, which functions as a pressure roller and may typically be constructed of hard rubber or similar resilient material and which is arranged to to be moved into and out of contact with heater plate 6. Pressure roller 7 and heater plate 6 are arranged in their operable positions to be in close contact with each other, so that the web of film 3 is arranged therebetween. Film web 3 is constructed of a base material having applied thereon, or sequentially deposited in a frame-by-frame fashion, a heat- bonding film layer 8, as seen in FIG. 1, which is slightly narrower in width and slightly shorter in length than the overall dimensions of the paper sheet L. The heat-bonding film layers 8 deposited on film web 3 have a predetermined spacing therebetween so that a selected pitch W is formed of the film layers and the intermediate spaces. The arrangement of individual film element 8 on web 3 is represented clearly in FIGS. 3A and 3B, in which the repetitive pitch W of films 8 is seen.

Were film layer 8 to be deposited continuously on web film 3, it would be impossible to provide the film coating over less than the overall length of the print, because after film layer 8 was thermally bonded to the paper sheet L it would be essentially impossible to cut the film layer to a size less than that of the paper. Moreover, the discrete individual film elements 8 are provided on web 3 because if a portion of film layer 8 was not laminated onto the paper sheet L and such were passed through heater 6 the adhesive agent thereof would be activated by the heat and would adhere to the pressure roller 7.

Film layer 8 is formed of a transparent polyester resinous material and, thus, is able to be bonded at a predetermined temperature higher than room temperature yet when at room temperature it will be solidified and remain bonded to film web 3, thereby forming sheets of transparent film. Nevertheless, because film 3 is made of transparent polyester resinous material it is sufficiently softened by the heat applied by heater 6 yet still remains in a solidified state at room temperature. Also, although continuous web 3 is made of transparent resinous material, it is chosen so that it never becomes softened by the heat applied by heater 6. Alternatively, it is possible to form web film 3 during its initial manufacturing process so that the polyester resinous material which is heated and softened is coated frame by frame onto the film base 3 having the desired predetermined pitch W, is solidified or set, and then wound into the roll in order to be subsequently threaded between supply reel 2R and take-up reel 2L. This apparatus then constitutes a transfer station to transfer successive film layers 8, which have previously been deposited on film web 3, onto sheets of paper L by means of heater 6 and pressure roller 7.

Other elements of the present invention are shown in more detail in FIG. 2, in which idler roller 10 is rotatably mounted at the end of a pivotable arm 9, and idler roller 10 is arranged to be in rotatable contact with guide roller 4R at the entrance or lead-in side relative to supply reel 2R. When pivotable arm 9 is rotated in the clockwise direction as seen in FIG. 2, idler roller 10 will be in close contact with guide roller 4R and thus idler roller 10 will be caused to rotate by roller 4R so that film web 3 is gripped therebetween. At the appropriate time the paper sheet L is inserted ino the nip between guide roller 4R and idler roller 10 at the lead-in side so that it can be superpositioned in relation to laminate film 8. Following such coming together of the web 3 and paper sheet L between idler roller 10 and guide roller 4R at the exit side of the two respective rollers there is delivered paper sheet L and film web 3 held in intimate contact.

The pivotable position of pivoting arm 9 upon which idler roller 10 is rotatably mounted is controlled by drive controller 5 so that when paper sheet L is inserted between guide roller 4R and idler roller 10 rotatable arm 9 is pivoted downwardly, in a counterclockwise direction as seen in FIG. 2, in order to allow idler roller 10 to be spaced apart from guide roller 4R, while paper sheet L is positioned in relation to film web 3. Then, pivoting arm 9 is rotated in a clockwise direction to bring idler roller 10 into contact with guide roller 4R so that the sheet and web are arranged therebetween.

Referring to FIG. 3, an aperture 11 is provided in web 3 at the beginning or slightly ahead of each of the respective film layers 8 formed thereon. More specifically, at the lead-in, right-hand edge position of the beginning of each film layer 8 is arranged an aperture 11 which cooperates with optical position detector 12 as shown in FIG. 3B. The optical position detector 12 is arranged in order to cooperate with aperture 11 in a direction perpendicular to the plane of the flat surface of continuous web 3. In one embodiment, position detector 12 may comprise a light-emitting diode (LED) as a light source 12A and a photo transistor as a light receiving element 12B to receive the light emitted from the light source. These elements are seen in FIG. 2 wherein it is shown that position detector 12 produces a detection signal D1 having a signal level corresponding to the optical transmission density of an element interposed between the light receiving element 12B and the light source 12A and supplies such detecting signal D1 to a position detecting circuit 14. In regard to the sensing of elements interposed between the light receiving element 12B and light source 12A when paper L is arranged therebetween, the light from the light source 12A will be completely shielded and will never reach light receiving element 12B. In that situation, light receiving element 12B will produce a detection signal D1 having the lowest signal level possible, as represented at waveform L1 in FIG. 4A. In the situation when paper sheet L is not interposed between light source 12A and light receiving element 12B, and when the aperture is not aligned between the source and the receiver nor is a film layer 8 arranged therebetween, light receiving element 12B will produce a detection signal D1 having an intermediate signal level L2, as seen in FIG. 4A. The other situation that can occur is when there is no paper sheet L between the source and the receiving elements, however, the aperture is aligned therebetween and, thus, the output level of detection signal D1 is at its highest level, as represented at L3 in FIG. 4A. As a means of providing relative reference levels, note that the intermediate signal level L2 corresponds to the transmission density of the continuous web 3 and in this embodiment such web in assumed to have a transmission density of approximately 75% and in relation to the level of signal level D1 when aperture 11 is aligned between light source 12A and light receiving element 12B. Similarly, relative to such level of signal D1 when the paper sheet L is arranged between the receiving element 12B and light source 12A, the optical transmission is 0%, that is, the transmission density of the paper L is assumed to be sufficiently high that no light passes through.

As seen in FIG. 3B, a second optical position detector 15 is arranged at a position directly across from the first optical detector 12 relative to the longitudinal in the direction of the continuous web 3 and also at the leading edge of the film layer 8. Optical position detector 15 also includes a light source 15A and light receiving element 15B and a detection signal D2 is produced by light receiving element 15B and fed to position detecting circuit 14. Thus, as represented in FIG. 4B, detection signal D2 produced by light receiving element 15B has an intermediate signal level L2 when continuous web film 3 is interposed between light source 15A and light receiving element 15B and has a signal level L1 corresponding to a lowest output level from light receiving element 15B when paper sheet L is interposed therebetween. A maximum signal level produced by light receiving element 15B corresponding to level L3 would be present when there is no film web, paper, or anything interposed between the light receiving element 15B and light source 15A. This situation would occur at start-up or thread-up and at the end of the supply reel of the continuous web film 3.

Additionally, as shown in FIG. 3B, an opaque end mark 16 formed of a light-shielding material is coated onto or bonded to web film 3 at the beginning of the last film layer 8 on the continuous web film 3 to provide an optical position indication so that when end mark 16 becomes interposed between light source 15A and light receiving element 15B, the level of the detection signal D2 will assume the lowest signal level L1 thereby signalling the arrival of the last film layer 8 on web 3.

FIG. 5 shows the detecting circuit 14 in more detail and, as noted above, position detecting circuit 14 receives detection signals D1 and D2 and determines the position of the various materials interposed between optical position 12 detectors and 15 in accordance with the transition of the signal levels of the respectively received signals. First detection signal D1 from first optical position detector 12 is supplied to the inverting input terminal of a comparator circuit 22, which forms the basis of a film existence judging circuit 21. The inverting input is compared with a reference voltage level VL2 fed to the non-inverting input of comparator circuit 22, and this voltage is set by means of a reference voltage circuit 23. The level of reference voltage VL2 is chosen as an intermediate level so as to be between the intermediate detection signal level L2 and the highest detection signal level L3 of detection signal D1, as represented in FIG. 4A. In this fashion, when continuous film web 3 is interposed between the two elements of first position detector 12, detection signal D1 will assume level L2, which is lower then the reference voltage VL2 so that comparator circuit 22 will produce an output signal S1 having a high state represented as "H". Detection signal D1 from first position detector 12 is also fed to the inverting input of a second comparator circuit 26 which forms the basis of a paper existence circuit 25. The non-inverting input of comparator circuit 26 receives a low level reference voltage VL1 which is determined by a reference voltage circuit 27. The level of reference level VL1 is set at a level slightly higher then the lowest level L1 of detection signal D1, and in this fashion when the paper L is interposed between the elements of first position detector 12, light from light source 12A is blocked from light receiving element 12B and comparing circuit 26 will produce an appropriate identifying signal S2 having a high level, as represented by a logical "H". Thus, when no paper sheet L is detected by first position detector 12, and regardless of the existence of continuous film 3, the logic level of the output signal of comparator circuit 26 will fall to a low level, represented as "L". The output signal D2 of second position detector 15 is fed to the inverting input of a third comparison circuit 30 that forms the basis of a paper and end mark identifying circuit 29. The non-inverting input of a comparator circuit 30 is connected to receive a voltage level L1, as produced by a reference voltage circuit 31. Again, the level of this reference voltage VL1 is set at a signal level slightly higher than the lowest signal level VL1 of detection circuit signal D2, as represented in FIG. 4B. By operation of this identifying circuit 29 when paper L or when end mark 16 is within the elements of second position detector 15, the signal level of detection signal D2 will assume its lowest level L1, whereby comparator circuit 30 will produce an identifying signal S3 having a high signal level corresponding to logic level "H".

The film existence identifying signal S1 produced by comparator circuit 22 is feed to one input of AND gate 32 and the other input thereof is obtained from the paper existence identifying signal S2 produced by comparator circuit 26 after having been passed thorough a signal inverter 33. Thus, when the signal level of the paper existence signal S2 is at a low level, indicating that no paper L is disposed within first optical position detector 12, the inverter 33 will act to raise such low level to a high level and then AND gate 32 will produce an output signal S11 indicating the detection of the beginning of the film layer 8. This signal level will fall from a high logic state "H" to a low logic state "L" when the signal level of the identifying signal S1 similarly falls from a high level to a low level indicating that aperture 11 is now present within the elements of first optical position detector 12.

The paper existence identifying signal S2 produced by second comparator 26 is also fed to one input of another AND gate 34 that has its second input obtained from the paper end mark identifying circuit 29. More particularly, paper end mark identifying signal S3 from comparator circuit 30 is fed to the other input of second AND gate 34 such that when the paper end mark identifying signal has a high level corresponding to logic state "H" indicating that either the paper L or the end mark 16 is present between the elements of position detector 15, and when the paper existence signal S2 rises from a low level to a high level indicating that paper L has now become arranged, or is now present, between the elements of first optical position detector 12, second AND gate 34 will produce a high logic level signal S12 rising from a logic "L" to a logic "H". This then forms a paper insertion detection signal S12 fed to drive controller 5.

Finally, the paper end mark identifying signal S3 is also fed to one input of a third AND gate 35 that has as its second input the film existence signal S1 having been passed through a signal inverter 36. The result of this is that when the film existence signal S1 is at a low level, indicating that no film or paper exists between the elements of position detector 12, that is, aperture 11 is present, and the level of the paper and end mark identifying signal S3 rises from a low level to a high level indicating that either end mark 16 or paper L is now present within the elements of second optical position detector 15, third AND gate 35 will produce a high signal representing a film end detection signal, and the level of the signal will rise from logic level "L" to logic level "H". All of these indicating signals as produced by AND gates 32, 34, and 35 are respectively fed to drive controller 5, so that the appropriate drive conditions can be maintained based upon the correspondingly provided status signals.

FIGS. 6 and 7 further illustrate the operation of the present invention and, particularly, in the arrangement described hereinabove when aperture 11 indicating the presence of the next film layer 8 has not yet reached first optical position detector 12, as represented in FIGS. 6 and 7, the various signals provided will be in the state represented during time period T2 in FIGS. 4A-4H. More specifically, because as seen in FIG. 6 continuous web film 3 is interposed between the respective elements of first and second optical position detectors 12 and 15, detection signal D1 and detection signal D2 will both be at the intermediate signal level L2, thereby producing the result that the identifying signals S1, S2, and S3 will assume corresponding logics state "H", "L", "L", respectively, as represented in FIGS. 4C, 4D, and 4E, respectively. When such signals are present drive controller 5 controls the pivotable arm 9 so that it rotates to a position at which idler roller 10 is spaced apart from guide roller 4R, and take-up reel 2L and ancillary pressure roller 7 are operated so as to feed the continuous web 3 in the direction shown at arrow K1 in FIG. 2. This has the result that aperture 11 at the head end of the next sequential film layer 8 is gradually moved so as to approach first optical position detector 12, as represented by arrow K2 in FIGS. 6 and 7.

Thus, once aperture 11 is in the view of first optical position detector 12, the respective signals in the system will be set in the state as represented during time period T3 in FIGS. 4A-4H. More specifically, at that time no film web 3 will exist between the elements of first optical position detector 12, whereas there will be film present between the elements of second optical position detector 15. Thus, the signal level of first detection signal D1 from first position detection 12 will rise to its highest level L3, and this is then identified by the output signal S1 of film existence identifying circuit 21 and the logic level of signal S1 will fall from a high logic state "H", to low logic level state "L". Additionaly, the logic level of the detection signal S11 that serves to detect the beginning of the film layer as produced by first AND gate 32 will also fall from a high logic level "H" to a low logic level "L". The time at which the logic level of this detection signal S11 drops indicates the time at which aperture 11 for the corresponding film layer 8 arrives at its predetermined position, that is, the position as determined by first optical position detector 12. Accordingly, at this instant drive controller 5 operates to stop the rotation of take-up reel 2L and of ancillary pressure roller 7. At this point, continuous web film 3 is arranged so that the next sequential one of the plurality of film layers 8 is positioned just at the entrance of heat-bonding heater element 6.

Thus, now that the film 8 on web 3 is poised at the entrance of the transfer station a sheet of paper L is inserted between guide roller 4R and idler roller 10 in a direction shown at K3 in FIG. 2, and this operation can be manually performed or an automatic feed can be provided. As represented by arrow K4 in FIGS. 6 and 7, the lead portion of paper L is therefore approaching first optical position detector 12, and when the leading edge of the sheet of paper L arrives at the first position detector 12 the paper will be interposed between the elements thereof, so that the light transmission is interrupted and the respective signals will assume the levels represented during time period T4 in FIGS. 4A-4H. At this point, the detection signal D1 from first optical position detector 12 will be lowered in level to its lowest signal level L1, so that the identifying signal S1 of film existence identifying circuit 21 and the identifying signal S2 of the paper existence identifying circuit 25 will both rise to a high level represented as logic "H" in FIGS. 4C and 4D.

Now, if paper L is inserted correctly that is, straight ahead and not misaligned, when the leading edge thereof is interposed between the elements of first optical position detector 12, it will also be interposed at the same time within the elements of second optical position detector 15, so that the logic level of detection signal D2 will also drop to its lowest signal level L1, as represented in FIG. 4B. Thus, the logic level of identifying signal S3 of the paper end mark identifying circuit 29 will rise to logic level "H" as represented in FIG. 4E during time period T4. Accordingly, the logic level of the paper insertion detection signal S12 produced by second AND gate 34 will rise from a low level to a high level and assume logic state "H", as seen in FIG. 4G. This rising of the logic level indicates the time at which the paper L is ready to have the corresponding film layer 8 superimposed thereon. Therefore, as the logic level of the detection signal S12 rises, drive controller 5 causes pivotable arm 9 to pivot, in a clockwise fashion as seen in FIG. 2, thereby allowing idler roller 10 to be in rotatable contact with guide roller 4R. Additionally, flat heater element 6 is energized to carry out the required thermal transfer of the film 8 to the paper L.

Accordingly, the arrangement of paper sheet L and heat transferrable film layer 8 formed on continuous film web 3 are accurately positioned by means of only two optical position detectors 12 and 15, so that paper sheet L and film layer 8 are superimposed at the precise position. Thereafter, the paper sheet L and film layer 8, which now is superimposed one on the other, are gripped and held by action of the idler roller 10 and guide roller 4R. Thus, in this state heater 6 is than energized and enters into a preparatory heating stage.

When paper L is positioned incorrectly so that it is misaligned or displaced laterally relative to the longitudal direction of film web 3, paper L will cover only one of the two optical position detectors 12 and 15. The result of this is that the logic level of either identifying signal S2 or signal S3 will assume a low logic level "L", so that the logic level of the paper insertion detection signal S12 produced at the output of AND gate circuit 34 will not rise to a high level but will remain at a low logic level "L". Accordingly, by use of only two position detectors, the present invention prevents the feeding of paper sheet L and film 8 to the heater element 6 in a misaligned state, in which case the portion of film layer 8 not covered by paper sheet L would adhere to ancillary roller 7, thereby hindering operation of the apparatus. By providing a logic circuit for the position detecting element 14, as represented in FIG. 5, the possibility that film layer 8 will be transferred to pressure roller 7 is eliminated.

Once the temperature of heater 6 has been raised to the temperature at which film layer 8 becomes a heat bonding substance, this temperature is detected by a thermostatic detector 16, which is arranged in contact with heater element 6, as represented in FIG. 2. Thermostatic detector 16 produces a temperature detection signal S21 fed to drive controller 5, which provides the signals to rotate take-up reel 2L and ancillary roller 7. In the event that the proper temperature of heater 6 is not reached, then temperature detection signal will keep such elements from rotating. At such time that the proper temperature has been detected, as indicated by temperature detection signal S21 fed to drive controller 5, film web 3 is fed in the direction of arrow K1 by rotation of take-up reel 2L and paper sheet L is pressed against film 3 by guide roller 4R and idler roller 10, the paper L is fed along with the film 3 through the first and second optical position detectors 12 and 15 to the nip or space between heater plate 6 and ancillary pressure roller 7. Thus, film layer 8 that is adhering to film 3 is softened by the heat from heater 6, released from film web 3, and firmly bonded to paper L. Accordingly, when the film 3 and paper L have been passed through the space between heater plate 6 and ancillary roller 7 and are present at the output end thereof, the film 8 originally adhering to film web 3, as represented in FIG. 8A, will now be transferred to the surface of paper sheet L, as represented in FIG. 8B. Thus, paper L has been subjected to a lamination process and is produced at the exit side of heater plate 6 and ancillary roller 7, and the continuous web of film 3 with the film layer 8 having been peeled off is then taken up by take-up reel 2L.

After such film feeding operation, aperture 11 which was interposed between the elements of first optical detector position 12 now passes first optical position detector 12 so that the levels of detection signals D1 and D2 of first and second optical position detectors 12 and 15, respectively, are rturned to the state as represented during time period T2 of FIGS. 4A-4H. Thus, once film 3 has been transported by a length corresponding to one pitch W, as shown for example in FIG. 3A, and the next aperture 11 corresponding to the next succeeding heat-bonding film layer 8 arrives at the first optical position detector 12, the signal levels will now assume the state described herein above in connection with time period T3 in FIGS. 4A-4H, so that drive controller 5 will stop rotation of the take-up roller 2L and ancillary roller 7 and will turn-off the power to heater 6. At that time drive controller 5 will also cause pivotable arm 9 to rotate so that idler roller 10 is no longer in contact wih guide roller 4R and, thus, film web 3 is stopped in the state in which the next heat bonding film layer 8 is positioned at the entrance of the heating transfer station and awaits insertion of a new paper sheet L to be laminated.

Thus, the plurality of heat bonding films 8 which are sequentially arranged on web film 3 are then thermally bonded onto respective sheets of paper L, which are sequentially inserted during a time period as might be represented at T5 in FIGS. 4A-4H. Accordingly, once the last one of the heat-bonding film layers 8 is positioned relative to position detector 12, the signal levels will be in a state as represented at T6 in FIGS. 4A-4H. More specifically, at such time because aperture 11 is interposed between the elements of first optical position detector 12, the level of detection signal D1 is high, as represented at level L3 in FIG. 4A, while at the same time because end mark 16 is interposed between the elements of second optical position detector 15, the level of detection signal D2 will be at its lowest level L1 as represented in FIG. 4B. Thus, this situation can only occur in the presence of the last film layer 8 on the web, and although the level of the identifying signal S1 will go to a low level "L" similar to the case that might be present in time period T3, the level of identifying signal S3 will rise to a high level "H", which is not present in the situation as operating in period T3. Consequently, the signal level of the film end detection signal S13, which is produced at the output of third AND gate 35 will rise from a low level "L" to a high level "H", as represented in FIG. 4H. As a result of this transition in levels of signal S13 in rising to logic level "H" at this particular time, the drive controller 5 can determine that all of the heat bonding film layers 8 along the length of the continuous web film 3 have been completely used and then the mode of the film laminating apparatus 1 is set to the stop mode. Consequently, the spent continuous web 3 would be removed from the apparatus and all signal levels will be as represented and time period T1 in FIGS. 4A-4H.

Although in the above-described embodiment the spacing or pitch between the sequential film layers 8 on the continuous web 3 are equal for all such layers the present invention is equally applicable to an embodiment in which there are different spacing between successive film layers. It is then appreciated that the device described herein above can sense any arrangement of film layers 8 on web 3 provided that the apertures 11 are arranged in advance in the leading edge of the respective film layers 8. Additionally, while the heat transfer operation in the herein described embodiment utilized a heat plate 6 in contact with an ancillary roller 7, the present invention may also be modified to use a pair of heated rollers in rotatable contact with each other in order to bond the film layer 8 to the paper L.

Additionally, in the embodiment described herein aperture 11 is provided to indicate the beginning of each film layer 8 on film web 3, however, this is not necessary to the practice of the present invention and any indicia having an optical transmission density or reflectivity density that is different than the base layer of the web 3 and the film layer 8 can be positioned appropriately on the film 3.

Accordingly, the present invention provides a thermal transfer apparatus wherein because an aperture 11 is formed in a continuous film web 3 in correspondence with the location of each film layer 8 arranged on the web 3, it is possible to determine the position of each respective film layer using only two optical position detectors and high accuracy can be obtained using a relatively simply construction. Moreover, it is possible to use a plate heater having a flat surface, which involves a much smaller heat capacity than is normally required using heat rollers so that the thermal insulation requirements of the entire apparatus can be held to a minimum.

Further, although the above described embodiment is described in terms of manually feeding the paper sheets L into the transferred device an automatic feeder could be easily arranged.

Although illustrative embodiments of the present invention have been described in detail above with reference to the accompanying drawings, it is understood that the invention is not limited to those precise embodiments, and that various changes and modifications can be effected therein by one skilled in the art without departing from the scope or spirit of the invention, as defined by the appended claims.

What is claimed is:

1. A film laminating apparatus in which a plurality of thermal-activation film layers are sequentially and detachably arranged with a predetermined spacing therebetween in a film web for delivery to a thermal transfer station along with a paper element, for transferring a film layer to respective ones of said paper element, said transfer station including a flat heater element connected for energization and a pressure roller operable for movement against and away from said heater element, said heater element and said pressure roller being arranged to receive said film web and said paper element therebetween, and said apparatus comprising:

optical position indicating means having an optical transmissivity different from an optical transmissivity of said film web and being arranged adjacent to a head and of each of said thermal-activation film layers;

optical position detecting means arranged at a predetermined spaced-apart location relative to said thermal transfer station for producing output signals indicating respective positions of siad film layers; and controller means receiving said output signals from said optical position detecting means for operating said thermal transfer station and said transport mechanism in response thereto, whereby said film layers are thermally transferred to said paper element.

2. Laminating apparatus according to claim 1, in which said thermal transfer station includes a flat plate heater element connected for electrical energization and a Pressure roller element operable for movement against and away from said flat plate heater element in response to said controller means, said heater element and said pressure roller element being arranged to receive said continuous web film and said paper sheet element therebetween.

3. A film laminating apparatus in which a plurality of substantially rectangular thermal-activation film layers are sequentially and detachably arranged on and in alignment with a film web with a predetermined spacing therebetween for delivery to a thermal transfer station along with a paper element, for transferring a film layer to said paper element, said apparatus comprising:

optical position indicating means formed as a plurality of apertures through said continuous film web, each aperture being arranged at a leading corner of one of said film layers and having an optical transmissivity different from an optical transmissivity of said film web;

optical position detecting means arranged at a predetermined spaced-apart location relative to said thermal transfer station for producing output signals indicating respective positions of said film layers; and controller means receiving said output signals from said optical position detecting means for operating said thermal transfer station and said transport mechanism in response thereto, whereby said film layers are thermally transferred to said paper element;

said optical position detecting means including first and second pairs of light sources and light receiving elements, said first pair being arranged to sense said apertures in said continuous film web and said second pair being located substantially directly across from said first pair relative to the longitudinal direction of said film web.

4. A film laminating apparatus according to claim 3, further comprising end of web indictating means arranged relative to a last one of said film layers on said film web and comprising second optical position indicating means having an optical transmissivity different than said continuous film web, and said first optical position indicating means.

5. Laminating apparatus in which a substantially rectangular film layer is transferred to a paper sheet element, comprising:

a continuous web of film having said film layers aligned therewith and sequentially and detachably arranged thereon with a predetermined spacing therebetween;

a thermal transfer station;

transport means for transporting said continuous web of film through said transfer station;

optical position indicating means having an optical transmissivity different from an optical transmissivity of said continuous web of film and being arranged adjacent to a head end of each of said film layers on said continuous web of film, said optical position indicating means including a plurality of apertures formed through said continuous web of film and said apertures being located at a leading corner of each of said rectangular film layers, and further including first and second pairs of light sources and light receiving elements, said first pair being arranged to sense said aperture in said continuous web of film and said second pair being located across from said first pair relative to the longitudinal direction of said continuous web of film;

optical position detecting means for detecting the position of said film layers on said web relative to said transfer station and producing corresponding detection signals; and controller means receiving said detection signals from said optical position detecting means for controlling said transfer station and said transport means, whereby said paper sheet element is accommodated in juxtaposition to said films layers and said film layer is transferred thereto by said thermal transfer station.

6. Laminating apparatus according to claim 5, further comprising second optical position indicating means for indicating the end of said continuous web of film and being arranged relative to a last one of said film layers thereon, said second optical position indicating means having an optical transmissivity different than said continuous web of film and said first optical position indicating means.

7. Laminating apparatus for thermally transferring a film layer to a paper sheet element, comprising:

transfer station means for receiving therein sheets of paper and including a flat plate heater element connected for electrical energization and a pressure roller element operable for movement against and away from said flat plate heater element, said heater element and said pressure roller being arranged to receive a continuous web of film and said sheets of paper therebetween;

a continuous web of film having releasably affixed thereto a plurality of transparent film layers each having an outer surface coated with a heat-bonding material;

means for transporting said continuous web of film through said transfer station means;

means for detecting the position of said transparent film layer relative to an entrance of said transfer station means; and means for controlling the operation of said transfer station means in response to said means for detecting the position of said transparent film layer, thereby causing said film layer to be released from said continuous web of film and said heat-bonding material to be bonded to said paper sheet arranged in said transfer station means.

8. Laminating apparatus for thermally transferring a film layer to a paper sheet element, comprising:

transfer station means for receiving therein sheets of paper;

a continuous web of film having releasably affixed thereto a plurality of transparent film layers each having an outer surface coated with a heat-bonding material;

means for transporting said continuous web of film through said transfer station means;

means for detecting the position of said transparent film layer relative to an entrance of said transfer station means and comprising optical position indicating means comprising a plurality of apertures formed through said continuous web of film and having an optical transmissivity different from an optical transmissivity of said continuous web of film and being arranged adjacent to a head end of each of said transparent film layers, and optical position detecting means arranged at a predetermined spaced apart location relative to the entrance of said transfer station means for producing detection signals indicating respective positions of said transparent film layers:

said apertures being arranged at a leading edge at one corner of each of said transparent film layers and in which said optical position detecting means comprises first and second pairs of light sources and light receiving elements, said first pair being arranged to sense said apertures in said continuous web of film and said second pair being located across from said first pair in relation to a longitudinal direction of said continuous web of film.

9. Laminating apparatus according to claim 8, further comprising end of web indicating means arranged relative to a last one of said transparent film layers on said continuous web of film and comprising a second optical position indicating means having optical transmissivity different than that of said continuous web of film and of said first optical position indicating means.

* * * * *